(12) United States Patent
Kumar et al.

(10) Patent No.: US 11,429,308 B2
(45) Date of Patent: Aug. 30, 2022

(54) ADAPTIVE METADATA BATCHING BASED ON INPUT/OUTPUT RATE

(71) Applicant: VMWARE, INC., Palo Alto, CA (US)

(72) Inventors: Gurudutt Kumar, Bangalore (IN); Pradeep Krishnamurthy, Bangalore (IN); Prasanth Jose, Bangalore (IN); Vivek Patidar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 51 days.

(21) Appl. No.: 16/878,626

(22) Filed: May 20, 2020

(65) Prior Publication Data

US 2021/0294515 A1 Sep. 23, 2021

(30) Foreign Application Priority Data

Mar. 18, 2020 (IN) .............................. 202041011579

(51) Int. Cl.
*G06F 3/06* (2006.01)
*G06F 12/00* (2006.01)
*G06F 13/00* (2006.01)

(52) U.S. Cl.
CPC .......... *G06F 3/0653* (2013.01); *G06F 3/0611* (2013.01); *G06F 3/0614* (2013.01); *G06F 3/0659* (2013.01); *G06F 3/0683* (2013.01)

(58) Field of Classification Search
CPC ..... G06F 3/0653; G06F 3/0611; G06F 3/0659
USPC ....................................................... 711/154
See application file for complete search history.

(56) References Cited

U.S. PATENT DOCUMENTS

| 9,229,809 B2* | 1/2016 | Moss ................... G06F 11/1076 |
| 9,460,177 B1* | 10/2016 | Pawar ..................... G06F 16/27 |
| 10,235,060 B1* | 3/2019 | Baruch ................. G06F 3/0619 |
| 10,489,344 B1* | 11/2019 | Shaw ..................... G06F 16/185 |
| 2005/0033827 A1* | 2/2005 | Yamagami .............. H04L 29/06 709/219 |
| 2008/0059738 A1* | 3/2008 | Burr ..................... G06F 11/2064 711/E12.103 |
| 2015/0127619 A1* | 5/2015 | Jarvis .................. G06F 11/1471 707/685 |
| 2015/0134875 A1* | 5/2015 | Veal .................... G06F 12/0246 711/102 |
| 2015/0178171 A1* | 6/2015 | Bish .................... G06F 11/1471 714/20 |
| 2016/0378818 A1* | 12/2016 | Marcotte ............... G06F 16/183 707/703 |
| 2017/0123685 A1* | 5/2017 | Zuo ....................... G06F 3/0664 |

(Continued)

*Primary Examiner* — Mohamed M Gebril

(57) ABSTRACT

The disclosure supports both trickle and burst input/output (I/O) admission rates in journaling file systems. Examples include receiving incoming data; based at least on receiving the incoming data, generating metadata for a journal entry; adding the metadata to an active metadata batch; issuing a data write to write the incoming data to a storage medium; monitoring for a first trigger comprising determining that a data write for an entry in the active metadata batch is complete; based at least on the first trigger, closing the active metadata batch; and issuing a journal write to write entries of the active metadata batch to the storage medium. A second trigger comprises determining that a batch open time exceeds a selected percentage of a moving average of data write durations. A third trigger comprises determining that a batch counter exceeds a count threshold. These triggers work together to reduce I/O latencies.

20 Claims, 8 Drawing Sheets

(56) References Cited

U.S. PATENT DOCUMENTS

| | | | |
|---|---|---|---|
| 2018/0150487 A1* | 5/2018 | Olivier | G06F 8/71 |
| 2020/0026582 A1* | 1/2020 | Shveidel | G06F 3/0656 |
| 2020/0042707 A1* | 2/2020 | Kucherov | G06F 3/0683 |
| 2020/0117389 A1* | 4/2020 | Kang | G06F 3/0656 |
| 2020/0125649 A1* | 4/2020 | Hu | G06F 16/178 |
| 2021/0124657 A1* | 4/2021 | Kamran | G06F 9/547 |

\* cited by examiner

ADAPTIVE METADATA BATCHING BASED ON INPUT/OUTPUT RATE

RELATED APPLICATIONS

Benefit is claimed under 35 U.S.C. 119(a)-(d) to Foreign Application Serial No. 202041011579 filed in India entitled "ADAPTIVE METADATA BATCHING BASED ON INPUT/OUTPUT RATE" on Mar. 18, 2020, by VMWARE, Inc., which is herein incorporated in its entirety by reference for all purposes.

BACKGROUND

A journaling file system keeps a journal (e.g., log) of the changes that are to be made to a file system, but that may not have yet been completed. A common purpose is for crash consistency; to reduce recovery time and reduce the likelihood of data corruption in the event of a system crash (e.g., resulting from a power failure or data interruption for a storage medium). When the file system receives a write to a new block, corresponding metadata is computed and a journal entry with the metadata update is generated. A data input/output (I/O) operation is complete only when both the data write and the corresponding journal write are complete. The delay between incoming data being received and the I/O completion is called I/O latency and this latency is increased when both the data and the journal entry are written rather than just the data.

Each write event (data or journal) takes place at the block level in the sense that the entire block (typically 4K bytes) where the data is located must be written instead simply writing a subset of the data within the block. This introduces some overhead that is called I/O amplification because the amount of data that is written is amplified by the size of the block. Because of I/O amplification a series of smaller, individual write events may be slower than a single larger write event that aggregates (batches) the same data if several writes are made to the same block. If journal entries are not each immediately written after their corresponding data write events, there is a possibility to write the journal entries in batches to speed writing operations by reducing I/O amplification. That is, if metadata for multiple journal entries are written together as a batch, the larger count of entries in each batch may improve journal write event efficiency compared to individual writes.

Typically, there are two batching approaches employed, one based on time and one based on batch size. In the time-based approach, all metadata generated during a fixed time window is batched together. In the size-based approach, metadata is combined into a batch until a fixed count of entries is reached. Both of these approaches, fixed time and fixed size, have drawbacks. If the I/O admission rate is high, having a fixed batch size may reduce the opportunity to leverage larger batches for even greater efficiency, while having a fixed time window may place I/O latency above what is achievable with more rapid write events. If the I/O admission rate is a trickle, having a fixed time window may reduce the opportunity to leverage larger batches for even greater efficiency, while having a fixed batch size may increase I/O latency because of the delay of waiting for the slowly growing batch to reach the specified size. Thus, traditional batching mechanisms fail to achieve optimal I/O throughput and latency while reducing metadata I/O amplification.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for adaptive metadata batching based on input/output (I/O) rate. Disclosed adaptive metadata batching supports both trickle and burst I/O admission rates in journaling file systems. Examples include receiving incoming data; based at least on receiving the incoming data, generating metadata for a journal entry; adding the metadata to an active metadata batch; issuing a data write to write the incoming data to a storage medium; monitoring for a first trigger comprising determining that a data write for an entry in the active metadata batch is complete; based at least on the first trigger, closing the active metadata batch; and issuing a journal write to write entries of the active metadata batch to the storage medium. A second trigger comprises determining that a batch open time exceeds a selected percentage of a moving average of data write durations. A third trigger comprises determining that a batch counter exceeds a count threshold. When any trigger fires, the active batch is closed and written to the journal. Various combinations of the triggers may be implemented.

BRIEF DESCRIPTION OF THE DRAWINGS

The present description will be better understood from the following detailed description read in the light of the accompanying drawings, wherein.

DETAILED DESCRIPTION

Figure 1:
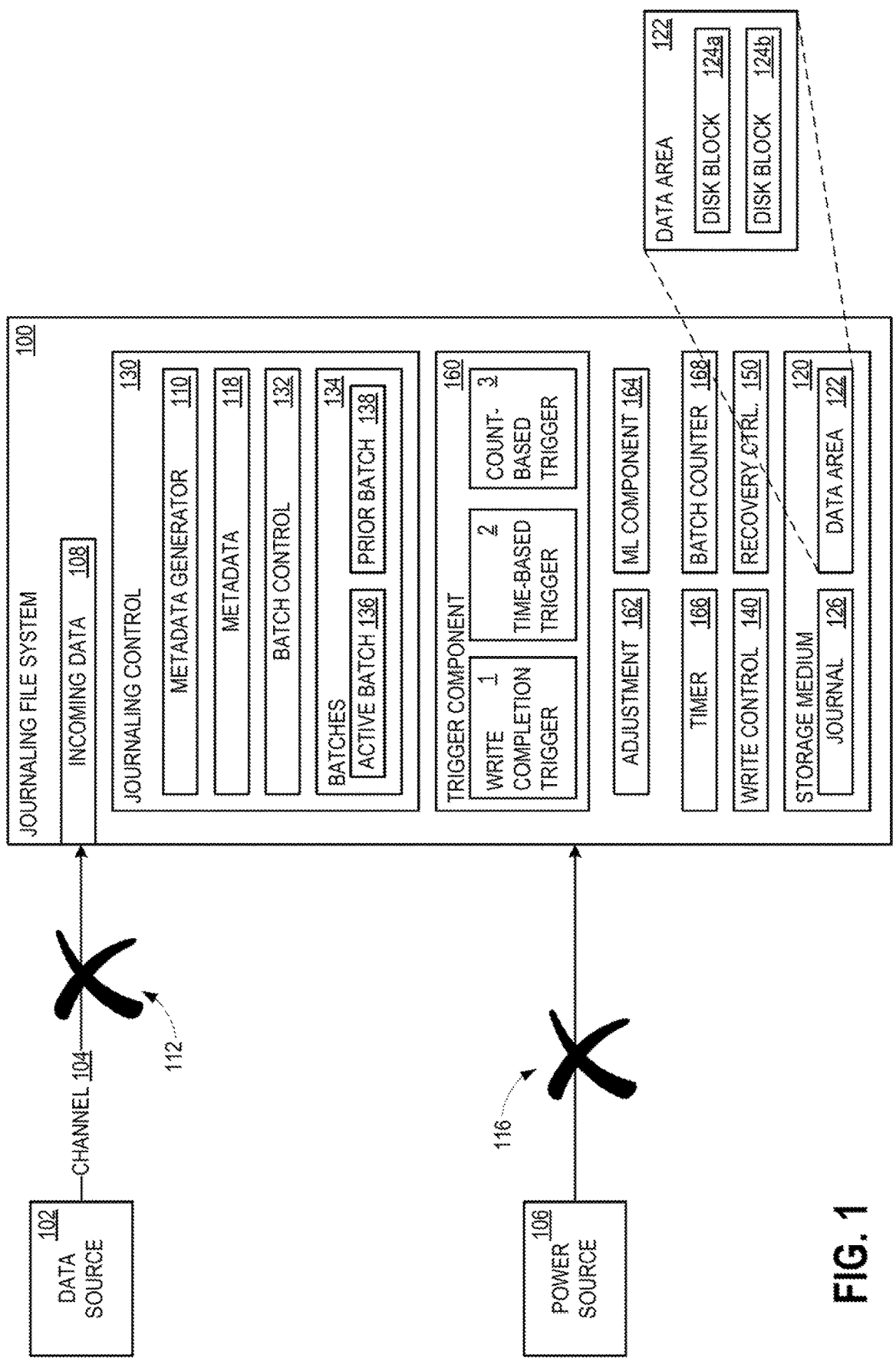
FIG. 1 illustrates a block diagram of an example journaling file system that can advantageously employ adaptive metadata batching based on input/output (I/O) rate.

While traditional systems wrote the data and metadata (journal entries) sequentially to a file system, to ensure that the journal entries could be trusted, recent advancements permit parallel writing. This frees up the need for serial write events, and allows parallel writing in which it is possible that the journal write finishes prior to the data write. This parallel writing, in turn, provides an opportunity to improve efficiency by aggregating (batching) the journal writes. Aspects of the disclosure improve the efficiency of recent crash consistency improvements that permit data input/output (I/O) and corresponding metadata I/O or journal updates to occur in parallel. Performance may increase when a balance is struck between the count of journal entries in a batch and the time for which the batch remains open (e.g., the time by which batch closure is delayed). Because the increase in potential performance involves both count and time, the relationship between a count and a unit of time is a rate, aspects of the disclosed solution adapt to I/O admission rate.

Thus, various aspects of the systems and methods described herein provide a flexible and scalable solution for adaptive metadata batching based on I/O admission rate, by reducing the effects of metadata I/O amplification. The disclosed adaptive metadata batching supports both trickle and burst I/O admission rates in journaling file systems. Aspects of the disclosure determine whether the I/O admission rate is a trickle or a burst, adjust to the speed of the storage medium, and adjust metadata batching (for journal writes) to reduce I/O latencies, such as by writing the active metadata batch based upon one or more triggers. An active metadata batch is a batch of all metadata that has been received since the prior batch was written to the journal, and is awaiting writing to the journal. Although metadata batching can improve I/O by aggregating multiple small journal write operations into a smaller number of larger write operations, holding the batch open for too long can reverse the gains in I/O latency improvement. Thus, multiple triggers are disclosed that flexibly and dynamically adapt batching to I/O admission rate.

For example, if a data write for the only entry or one among a relatively small number of entries in the active metadata batch has completed, and if there were no further writes, this condition indicates a trickle data rate. Detection of this condition is the first trigger. Continuing to hold the batch open with a trickle rate may worsen I/O latencies so, based upon this first trigger, the batch is closed and written to the journal. A second trigger tailors the process to the storage medium speed by determining that the time the batch has been open exceeds some time threshold. The time threshold is based on prior data write durations. A third trigger detects burst rates by determining that the number of entries in the active metadata batch exceeds a threshold prior to either of the other trigger conditions occurring. The triggers work together, in a hybrid approach, to automatically detect trickle or burst I/O admission rates and adjust, thereby accommodating ranges from trickle to burst. When any trigger fires, the active batch is closed and written to the journal. Various combinations of the triggers may be implemented, such as the first alone, the first and second together, the first and third together, all three together, and other combinations.

Aspects of the disclosure advantageously speed up computer I/O operations by adding the metadata to an active metadata batch and, based at least on a first trigger, closing the active metadata batch and issuing a journal write for the active metadata batch. Aspects of the disclosure advantageously also speed up computer I/O operations by adding the metadata to an active metadata batch and, based at least on a second and/or trigger, closing the active metadata batch and issuing a journal write for the active metadata batch. In comparison with fixed batch size batching or fixed time-based batching, disclosed solutions further improve I/O latency.

Aspects of the disclosure advantageously further speed up computer I/O operations by monitoring I/O latencies and adjusting the selected percentage of the moving average of data write durations (of the second trigger). Aspects of the disclosure advantageously further speed up computer I/O operations by monitoring I/O latencies and adjusting the count threshold (of the third trigger). In some examples, the adjustments for the second and/or third trigger may be performed by a machine learning (ML) component.

FIG. 1 illustrates a block diagram of an example journaling file system 100 that advantageously employs adaptive metadata batching based on I/O admission rate. In some examples, journaling file system 100 is implemented on one or more computing devices 700 of FIG. 7. Journaling file system 100 receives data for writing to a storage medium 120 from a data source 102 over a channel 104, and is powered by a power source 106. In some examples, data source 102 is memory, such as random access memory (RAM) within the same computing device. In some examples, data source 102 is an application (in memory) that is performing data I/O on journaling file system 100. In the context of this disclosure this data I/O is primarily write operations driven by the application. In some examples, data source 102 is a remote node. Unfortunately, real-world performance constraints and limitations mean that channel 104 may experience an outage 112 that interrupts the flow of data from data source 102. Additionally, power source 106 may fail, resulting in a power interruption 116. Either of these incidents may cause a crash in the writing operations, which are controlled by a write control 140.

Because storage medium 120 is a physical data storage device, such as one or more magnetic disks and/or other non-volatile storage media, writing data into storage medium 120 is not instantaneous. If, during the time period in which data is being written into storage medium 120 (e.g., a file system), either outage 112 or power interruption 116 (e.g., a crash) occurs (or some other failure), the data not yet written remains unwritten at least until recovery operations are complete. This means that the space on storage medium 120, which had been reserved for incoming data that had not yet been written at the time of the crash, will have whatever data (if any) had been written previously. If, after the crash, that space on storage medium 120 is read with the assumption that it was the data from data source 102, it will be corrupt (erroneous).

Therefore, a journaling control 130 manages a journal 126, so that recovery operations managed by a recovery control 150 can properly ascertain which data writing operations resulted in valid data being written to a data area 122 on storage medium 120. The batching of metadata by journaling control 130 (e.g., metadata 118 and other metadata) is managed by a batch control 132. Batch control 132 places metadata for journal writes in batches 134, for example current metadata into an active metadata batch 136, with earlier metadata for journal writes having been written into one or more of a prior metadata batch 138. Batch control 132 also monitors for one or more of a first trigger (a write completion trigger 1), a second trigger (a time-based trigger 2), and a third trigger (a count-based trigger 3). The first trigger is a write completion trigger because the trigger condition is based on a write operation completing. The second trigger is a time-based trigger because the trigger condition is based on the lapse of a certain amount of time. The third trigger is a count-based trigger because the trigger condition is based on a count of items in the active batch. Data and conditions for monitoring the write completion trigger 1, the time-based trigger 2, and the count-based trigger 3 are within a trigger component 160. In some examples, trigger component 160 uses time data from a time component 166 for the time-based trigger 2, to compute durations for data writes, and to determine I/O latencies. In some examples, trigger component 160 uses counting data from a batch counter 168 for the count-based trigger 3. In some examples, trigger component 160 uses a trigger adjustment component 162 to adjust one or both of the time-based trigger 2 and the count-based trigger 3, for improved operation over time. In some examples, trigger adjustment component 162 has an ML component 164 that is within or works with trigger adjustment component 162 to adjust one or both of the time-based trigger 2 and the count-based trigger 3.

Figure 2:
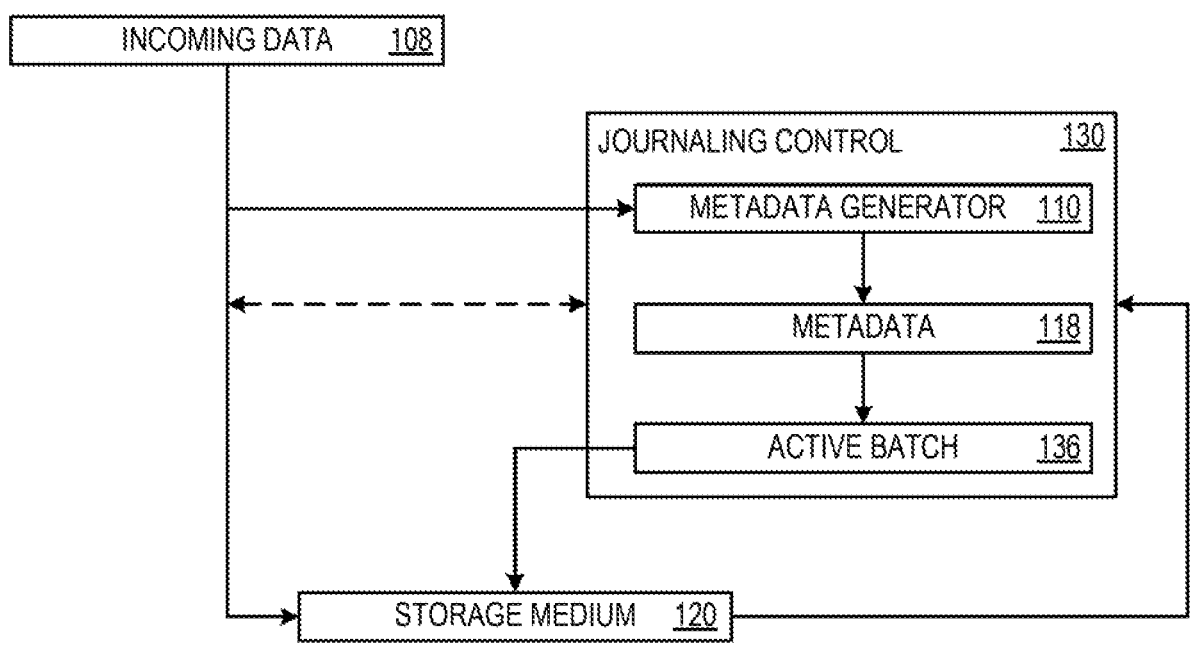
FIG. 2 illustrates data flows within the journaling file system of FIG. 1.

Data flows within journaling file system 100 are illustrated in FIG. 2. The operations of journaling control 130 are described in further detail in relation to a flow chart 300 of FIG. 3A and operations of trigger adjustment component 162 and ML component 164 are described in further detail in relation to a flow chart 400 of FIG. 4. The operations of recovery control 150 are described in relation to a flow chart 500 of FIG. 5. In some examples, the operations of flow charts 300, 400 and 500 are performed by one or more computing devices 700 of FIG. 7.

Referring next to FIG. 2, incoming data 108, from data source 102, is received by journaling control 130 and written to disk blocks 124a-124b in data area 122 on storage medium 120. Meanwhile, journaling control 130 uses a metadata generator 110 to generate metadata 118 for incoming data 108. Metadata 118 is added to active metadata batch 136, and later, based upon a trigger, written to storage medium 120. That is, incoming data 108 is written to storage medium 120 while metadata 118 is batched (e.g., aggregated with metadata for other incoming data). In some examples, the data I/O is not kept waiting, but is instead written to storage medium 120 as soon as metadata 118 is computed.

Storage medium 120 returns an indication of the write operation completions (for both incoming data 108 and metadata 118). In some examples, if incoming data 108 requires a while to write, and the active metadata batch closes shortly after receiving incoming data 108, metadata 118 is written quickly. In such scenarios, it is possible that the write operation for metadata 118 may complete prior to the completion of the write operation for incoming data 108. When both write operations are complete, in some examples, an acknowledgement is generated for the I/O completion.

Figure 3A:
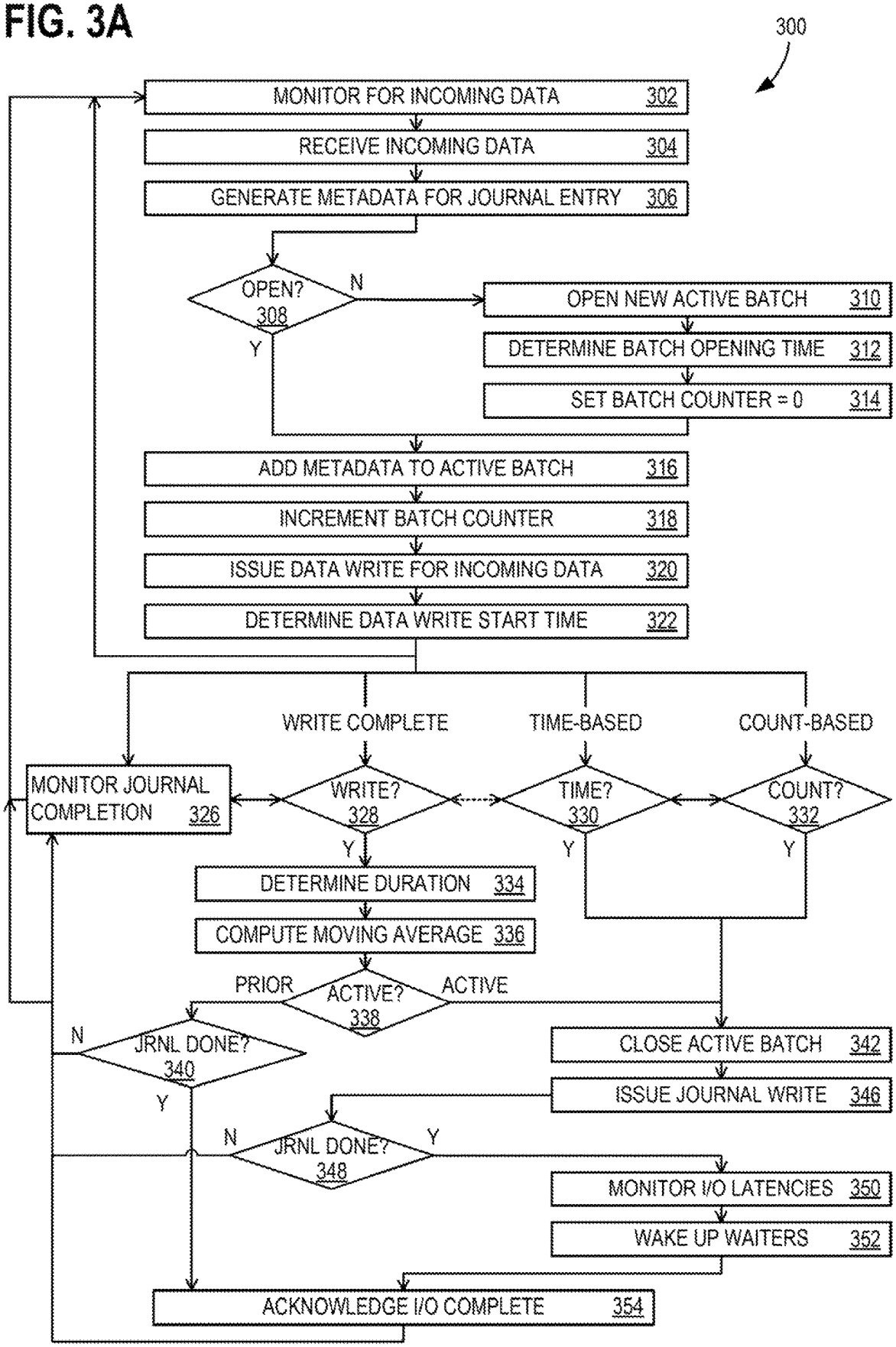
FIG. 3A illustrates a flow chart of exemplary operations associated with the journaling file system of FIG. 1.

With reference now to FIG. 3A, and continued reference to FIG. 1, operations of flow chart 300 are described. Although flow chart 300 is illustrated for simplicity as a complete workflow, the operations represented by flow chart 300 may be asynchronous. Journaling file system 100 monitors for incoming data 108 from data source 102 in operation 302, and operation 304 includes receiving incoming data 108. Operation 306 includes, based at least on receiving incoming data 108, generating metadata 118 for a journal entry for incoming data 108. Decision operation 308 determines whether active metadata batch 136 is open. If not, operation 310 includes, based at least on determining that no batch is open, opening active metadata batch 136. Any I/O received while active metadata batch 136 remains open has their metadata added to active metadata batch 136 and written to journal 126 together. Operation 312 includes determining a batch opening time, for example using time component 166, to use for the time-based trigger 2. The batch open time used by the time-based trigger 2 is the time that has elapsed since the batch opening time determined in operation 312. The time-based trigger 2 uses a selected percentage of a moving average (e.g., 25%, at least initially until adjustments are made) of prior data write durations, which are calculated in operations 334 and 336. In early use of journaling file system 100, there may be a low count of data write duration measurements to use for the time-based trigger 2. So, in some examples, the time-based trigger 2 is not used until a threshold number of data write duration measurements have become available. Operation 314 includes setting a batch counter 168 to zero. Batch counter 168 is used for the count-based trigger 3. When active metadata batch 136 is open, operation 316 includes adding metadata 118 to active metadata batch 136. Operation 318 includes, based at least on adding the metadata to the active metadata batch, incrementing batch counter 168.

Operation 320 includes issuing a data write for incoming data 108, to write incoming data 108 to storage medium 120, so that the data I/O is issued to the backend and is not kept waiting. In some examples, storage medium 120 comprises a magnetic disk. In some examples, storage medium 120 comprises multiple magnetic disks and/or other storage mediums such as flash memory based Solid State Disks (SSD). Operation 322 includes, based at least on issuing a data write for incoming data 108, determining a data write start time, for example by using time component 166. Latency time is calculated based on the total time taken for data write.

Flow chart 300 now has at least five parallel processes ongoing, while active metadata batch 136 remains open. One is a return to operation 302 to continue monitoring for additional incoming data. A second of the five parallel processes is operation 326, which includes monitoring for a journal write completion. This may be any journal write, whether for active metadata batch 136 or prior metadata batch 138. Although only a single prior metadata batch 138 is illustrated, there may be multiple prior metadata batches still awaiting journal write completion.

A third of the five parallel processes is decision operation 328, which includes monitoring for a data write completion. This may be any data write, whether for incoming data 108 or a prior data write. The combination of decision operation 328 and decision operation 338, which determines whether the recently completed data write corresponds to active metadata batch 136 or prior metadata batch 138, form the write completion trigger 1. Decision operation 338 is described in further detail herein. The write completion trigger 1 comprises determining that a data write corresponding to an entry in the active metadata batch is complete.

A fourth of the five parallel processes is decision operation 330, which includes monitoring for the time-based trigger 2. The time-based trigger 2 comprises determining that the batch open time exceeds a selected percentage of a moving average of prior data write durations. In some examples, the time-based trigger 2 is not used until a certain number of data I/O events has occurred, so that the moving average can be calculated using actual values. A fifth of the five parallel processes is decision operation 332, which includes monitoring for the count-based trigger 3. The count-based trigger 3 comprises determining that batch counter 168 exceeds a count threshold.

The five parallel processes, operations 302, 326, 328, 330, and 332, monitor for (1) additional incoming data, (2) journal write completion (metadata write completion), (3) data write completion (a portion of the write completion trigger 1), (4) a batch time time-out (the time-based trigger 2), and (5) batch counter 168 exceeding a count threshold (the count-based trigger 3). Operations 302, 326, 328 remain ongoing. Operation 302 continues because new incoming data may be received at any time. Operation 326 and decision operation 328 remain ongoing because they apply not only to the active batch (currently active metadata batch 136, but later a different batch), but also prior metadata batch 138. When any of the three triggers fire (e.g., completion of any write in the current active batch as determined by operation 328, excess batch open time as determined by operation 330, or an excess number of updates in the active batch as determined by operation 332), the result is the current active batch is closed. Once the batch is closed, the journal write is issued. On completion of the journal write, acknowledgement of I/O completion can be sent to the application (e.g., data source 102) for any I/Os that have completed a data write, as described below for operation 354.

If, as determined in decision operation 328, a data write has completed, operation 334 includes, based at least on the data write completion, computing a duration for the data write. Operation 336 includes computing a moving average of the prior data write durations, for use in the time-based trigger 2. Decision operation 338 determines whether the recently completed data write corresponds to active metadata batch 136 or prior metadata batch 138. Decision operation 338 forms a second part of the write completion trigger 1. Thus, the combination of decision operations 328 and 338 includes monitoring for a first trigger, the first trigger comprising determining that a data write corresponding to an entry for the active metadata batch is complete. That is, decision operation 328 monitors for a data write to be complete, and decision operation 338 determines whether the detected data write completion corresponds to an entry for the active metadata batch. A data write that does not correspond to an entry for the active metadata batch does not fire the write completion trigger 1.

If the recently completed data write corresponds to prior metadata batch 138, then this condition is not the write completion trigger 1. This is the completion of a data write after the journal write for prior metadata batch 138 was issued. Decision operation 340 determines whether the corresponding journal write had been completed. This uses information from operation 326, which may have previously recorded the journal write. If the corresponding journal write has not yet completed, it should be detected in ongoing operation 326. If, however, the corresponding journal write had been completed, then flow chart 300 moves to operation 354 to, based at least on completion of the data write and the journal write, acknowledge I/O completion to data source 102. This acknowledgement scenario (e.g., flow chart 300 reaching operation 354 via decision operation 340) is for other data, rather than incoming data 108. If flow chart 300 reaches operation 354 via operation 352, that other condition constitutes an acknowledgement of I/O completion to data source 102 for incoming data 108. Additional detail regarding operation 354 is provided below. Also, flow chart 300 keeps operations 302, 326 and 328 ongoing and, if a metadata batch is active, operations 330 and 332 also remain ongoing.

If the recently completed data write corresponds to active metadata batch 136, as determined in decision operation 338, this condition is the write completion trigger 1. This is the completion of a data write, whether for incoming data 108 or other incoming data. Operation 342 includes closing active metadata batch 136 to additional batch entries. Thus, even if the I/O admission rate is a trickle, active metadata batch 136 is closed once any one of the data I/O in active metadata batch 136 completes. Flow chart 300 may also reach operation 342 by decision operation 330 detecting the time-based trigger 2 and decision operation 332 detecting the count-based trigger 3. In some scenarios, operation 342 includes, based at least on the write completion trigger 1, closing active metadata batch 136. In some scenarios, operation 342 includes based at least on the time-based trigger 2, closing active metadata batch 136. In some scenarios, operation 342 includes based at least on the count-based trigger 3, closing active metadata batch 136. The time-based trigger 2 and the count-based trigger 3 are no longer are relevant for active metadata batch 136. In some examples, a new active batch is created immediately; in some examples, a new active batch is created when flow chart 300 reaches operation 310 again.

Operation 346 includes issuing a journal write for (recently closed, so no longer "active") active metadata batch 136, to write entries of active metadata batch 136 to storage medium 120. Decision operation 348 determines whether the journal write for active metadata batch 136 is complete. That is, decision operation 348, along with operation 326 includes monitoring for completion of the data write (for incoming data 108) and the journal write (for active metadata batch 136). If the journal write is not yet complete, flow chart 300 returns to ongoing operations 302, 326 and 328.

If the journal write is complete, operation 350 includes, based at least upon determining that the writing operations for both incoming data 108 and the journal entry for incoming data 108 (in active metadata batch 136) are complete, determining an I/O latency for incoming data 108. The I/O latency for incoming data 108 is used in the calculations for the time-based trigger 2. Operation 352 includes monitoring I/O latencies. In some examples, this includes, based at least upon determining the latency for incoming data 108, determining an average latency. In some examples, the average latency is a moving average. In some examples, the size of the moving average window may be adjusted, as described below in relation for FIG. 4.

Operation 352 includes, based at least on completion of the journal write, determining other data write operations awaiting completion of the journal write. This wakes up all waiters. Waiters, as used herein, are finished data I/O for which the journal write (metadata) had not previously been identified as complete. Operation 354 includes, based at least on completion of the data write and the journal write, generating an acknowledgment for completion of writing incoming data 108 to data source 102, and also for other now-completed waiters for which data source 102 had been awaiting acknowledgement of I/O completion. The acknowledgement that the I/O is complete issued to data source 102, which initiated the data write in operation 304.

Although flow chart 300 is illustrated for simplicity as a complete workflow, the operations represented by flow chart 300 may be asynchronous. For example, once an I/O is complete, data source 102 (e.g., an executing application or an external source) continues with any other operation that is not directly dependent on the I/O to complete. In some examples, one application thread (or process) has issued an I/O waits for it to complete, while the other threads in that same application continue with any other tasks. When both data write and journal write are complete journaling file system 100 issues an acknowledgement of I/O completion (operation 354) and the waiting application threads are woken up. Once the waiting application thread wakes up (operation 352) it receives the acknowledgement and takes further actions, as needed. For example, if the application (data source) is a virtual machine (VM) on a hypervisor, when the data write acknowledgement is received, application will be notified to the guest in the VM. If the data source is a database application, when the write acknowledgement is received, the application may mark the corresponding transaction as complete and move on to the next transaction.

Flow chart 300 returns to ongoing parallel operations 302, 326, and 328, and possibly also operations 330 and 332, if a batch is active. Flow chart 300 generally has between three and five parallel operations ongoing. Typically, operations 302, 326, and 328 remain ongoing independently of whether there is an active batch, but operations 330 and 332 remain ongoing only while there is an active batch. For example, if the result of decision operation 340 is no (that the corresponding journal write had not been completed), flow chart 300 returns to operations 302, 326, and 328, and only if there is an open batch, also go to operations 330 and 332. If however, the result of decision operation 340 is yes (that the corresponding journal write had been completed), flow chart 300 also moves to operation 354 in addition to performing the three or five parallel operations (302, 326, and 328, and possibly also operations 330 and 332). While operations 328, 330, and 332 are ongoing, they exit at the Yes branch if their test condition is met. Otherwise, operations 302, 326, and 328 just keep going in parallel—unless the active batch closes, in which case operations 330 and 332 cease.

Figure 3B:
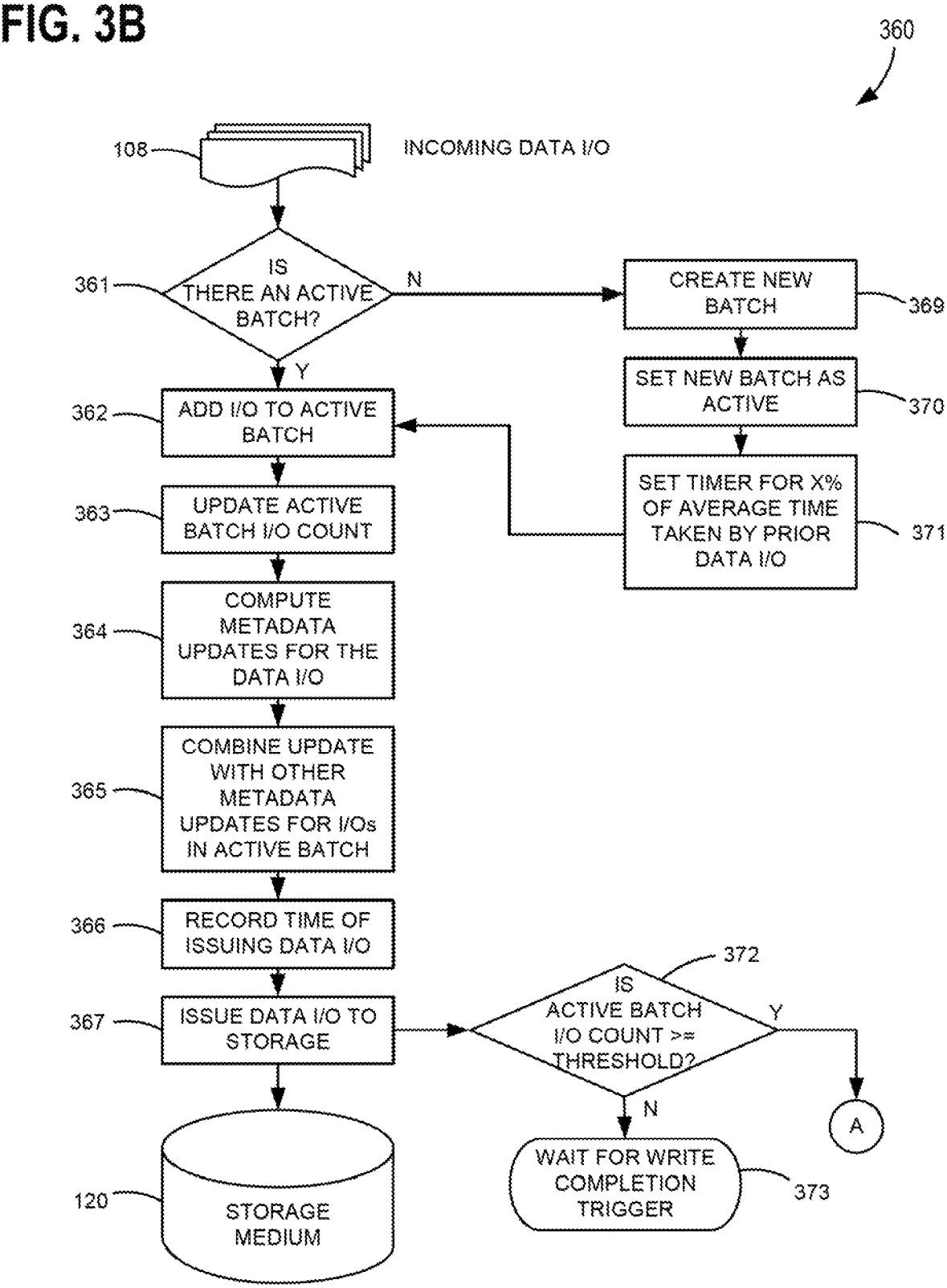
FIGS. 3B and 3C illustrate exemplary asynchronous workflows that provide the functionality of the flow chart of FIG. 3A.
Figure 3C:
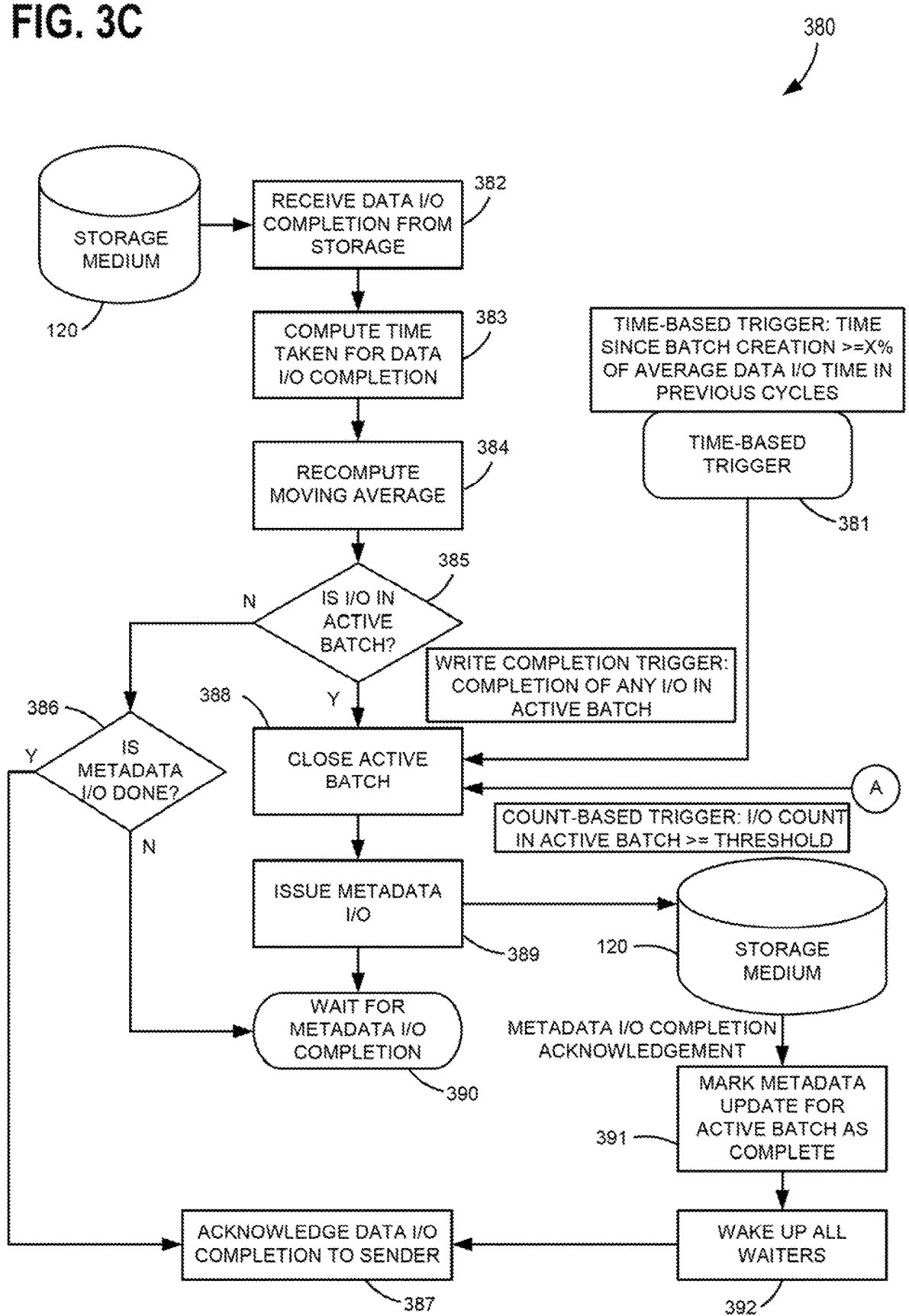

Some examples implement the functionality of flow chart 300 as asynchronous I/O workflows. Exemplary asynchronous I/O workflows 360 and 380 are illustrated in FIGS. 3B and 3C, respectively. FIGS. 3A-3C should be viewed together. Workflow 360 is a data I/O admission path, and workflow 380 is a data I/O completion path and batching. Operations within workflows 360 and 380 have equivalents to operations described above for flow chart 300, as noted below, enabling the functionality of flow chart 300 to be implemented asynchronously. For example, decision operation 361 of FIG. 3B, which determines whether there is an active batch open, is equivalent to operation 308 of FIG. 3A. Operation 369 creates a new batch and 370 sets (designates) the new batch as active. Together, operations 369 and 370 are equivalent to operation 310. Operation 371 sets up the time-based trigger 2, by setting a timer for a selected percentage of a moving average of prior data write durations. Together, operation 371 and box 381 of FIG. 3C are equivalent to decision operation 330.

Operation 362 adds the incoming I/O (incoming data 108 to the active batch, and operation 363 (which is equivalent to operation 318) updates the active I/O batch count. Operation 364 is equivalent to operation 302, operation 365 is equivalent to operation 316, and operation 366 is equivalent to operation 322. Operation 367 issues the data I/O to storage medium 120, equivalent to operation 320. Decision operation 372, box 373 (the "No" condition for decision operation 372), and Tab A (the "No" condition for decision operation 372), form the count-based trigger 3, and are equivalent to decision operation 332. In FIG. 3C, a data I/O completion acknowledgement is received from storage medium 120 in operation 382, and operation 383 is equivalent to operation 334 for computing data I/O completion times. Operation 384 is equivalent to operation 336, and decision operation 385 is equivalent to decision operation 338.

For the "No" path from decision operation 385, decision operation 386 is equivalent to decision operation 340. The "Yes" path from decision operation 386 leads to operation 387, which is equivalent to operation 354. The "No" path from decision operation 386 leads to box 390. The "Yes" path from decision operation 385 leads to operation 388, which is equivalent to operation 342, and operation 389 issues a metadata I/O, equivalently to operation 346. As shown, operation 388 is reached via any of the write completion trigger 1, the time-based trigger 2, and the count-based trigger 3. (See Tab A for the count-based trigger 3.) Operation 391 marks the metadata update for the active batch as complete, and operation 392 wakes up al waiters, equivalently to operation 352. Workflow 380 then proceeds to operation 387. Thus, the functionality of flow chart 300 may be accomplished with asynchronous I/O workflows 360 and 380, even when the operations are performed in a different order.

Figure 4:
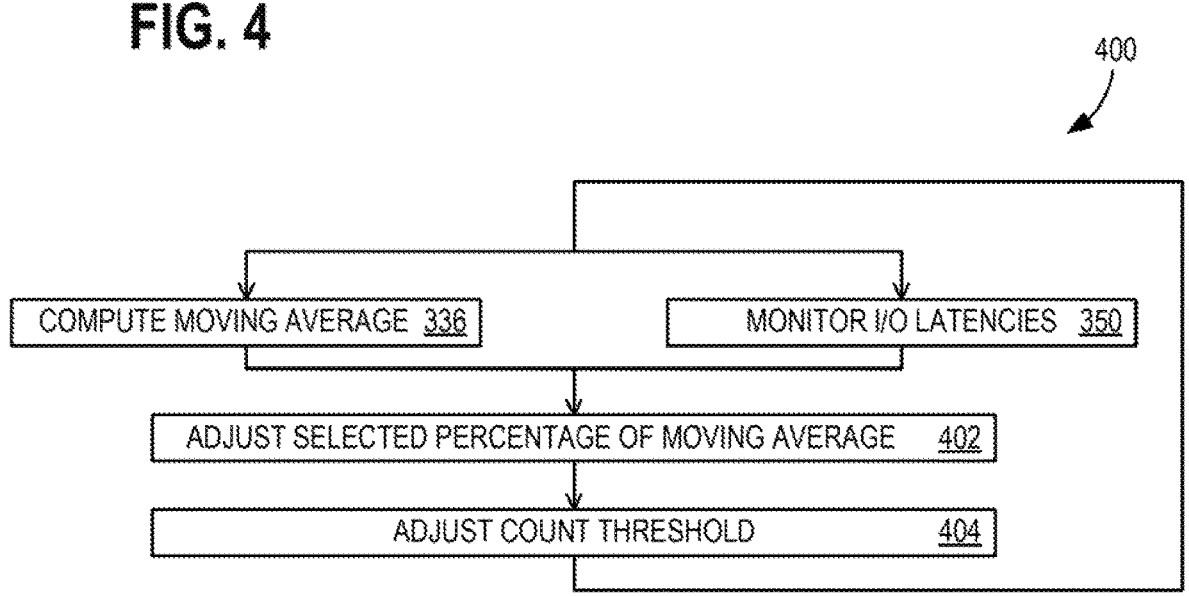
FIG. 4 illustrates a flow chart of exemplary operations that complement the flow chart of FIG. 3A.

FIG. 4 illustrates a flow chart 400 of exemplary operations for improving the time-based trigger 2 and the count-based trigger 3. With reference now to FIG. 4, and continued reference to FIGS. 1 and 3, operations of flow chart 400 are described. Operation 336, which includes computing a moving average of data write durations, along with monitoring I/O latencies in operation 350 provide input for operation 402. Thus, flow chart 400 may run in parallel with the parallel processes of flow chart 300, for as long as flow chart 300 is in operation. Although flow chart 400 is illustrated for simplicity as a complete workflow, the operations represented by flow chart 400 may be asynchronous. Operation 402 includes adjusting the selected percentage of the moving average of prior data write durations to reduce the I/O latencies. This adjusts the time-based trigger 2, in order to improve its performance over time. In some examples, the selected percentage starts at 25% and moves upwardly or downwardly. In some examples, the selected percentage is not adjusted until a threshold number of data write duration measurements have become available. In some examples, adjustments to the time-based trigger 2 may include changing the size of the moving average window for data write durations. In some examples, the time-based trigger 2 is not used until a threshold number of data write duration measurements have become available.

Operation 404 includes adjusting the count threshold to reduce I/O latencies. This adjusts the count-based trigger 3, to improve its performance over time. In some examples, the count threshold may be set to 128, 64, or another value. Adjustments to the count threshold may be upward or downward. In some examples, adjustments to the time-based trigger 2 and the count-based trigger 3 may further include changing the size of the moving window average for I/O latencies. In some examples, these adjustments are accomplished by a trigger adjustment component 162 within trigger component 160. In some examples, trigger adjustment component 162 uses feedback methods that make an adjustment, measure the effect, and calculate a subsequent adjustment. In some examples, trigger adjustment component 162 uses an ML component 164 to make the adjustments to the time-based trigger 2 and the count-based trigger 3. In some examples, trigger adjustment component 162 operates on user input, such as manual adjustments or a user instructing trigger adjustment component 162 that another adjustment should occur. In some examples, trigger adjustment component 162 makes adjustments on a schedule or by noticing (e.g., using received or calculated metrics) that I/O latencies are trending upwardly or have exceeded a threshold. The time-based trigger 2 and/or the count-based trigger 3 may thus be dynamically configurable.

Figure 5:
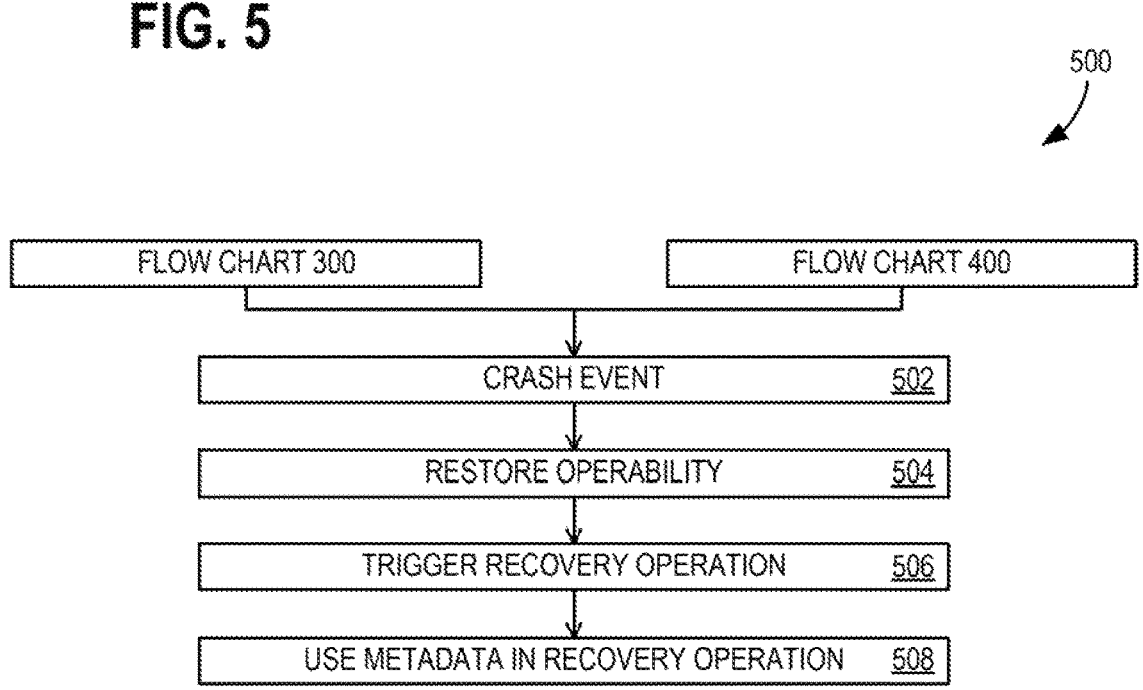
FIG. 5 illustrates a flow chart of exemplary operations that may be used in conjunction with the flow chart of FIG. 3A.

FIG. 5 illustrates a flow chart 500 of exemplary recovery operations associated with journaling file system 100 of FIG. 1, for example at least partially under the direction of recovery control 150. With reference now to FIG. 5, and continued reference to FIGS. 1, 2 and 3, operations of flow chart 500 are described. Flow charts 300 and 400 are performed as described above until a crash event occurs at 502, for example caused by either outage 112 or power interruption 116. The crash event ceases the operations of flow charts 300 and 400. Operability is restored at 504, and crash recovery begins upon a trigger, at 506. At 508, metadata 118, and other metadata in journal 126, are used in the recovery operation.

In general, journaling can be performed for both metadata and data. Each metadata journal entry or transaction has details of the metadata updates corresponding to a given new data write/update (data I/O). This metadata update in itself could be synchronously or asynchronously updated to its corresponding locations on the storage medium (e.g., storage medium 120) via an operation called replay. Typically, in journaling file systems, after the journal update is completed, the data write is issued. Once both journal and data write is completed, I/O is acknowledged to the data source (e.g., data source 102). Often, there is no need to wait for the metadata to be written out to its actual offsets on disk. If the system crashes before the I/O is acknowledged to the data source, but after the journal transaction has been written to the storage medium, then as part of recovery this transaction can be replayed to obtain to a consistent state of metadata. If the journaling mechanism includes both data and metadata, then after the transaction has been written to the storage, if there is a crash, recovery operation can reach a consistent state of metadata and data by replaying the journal.

Figure 6:
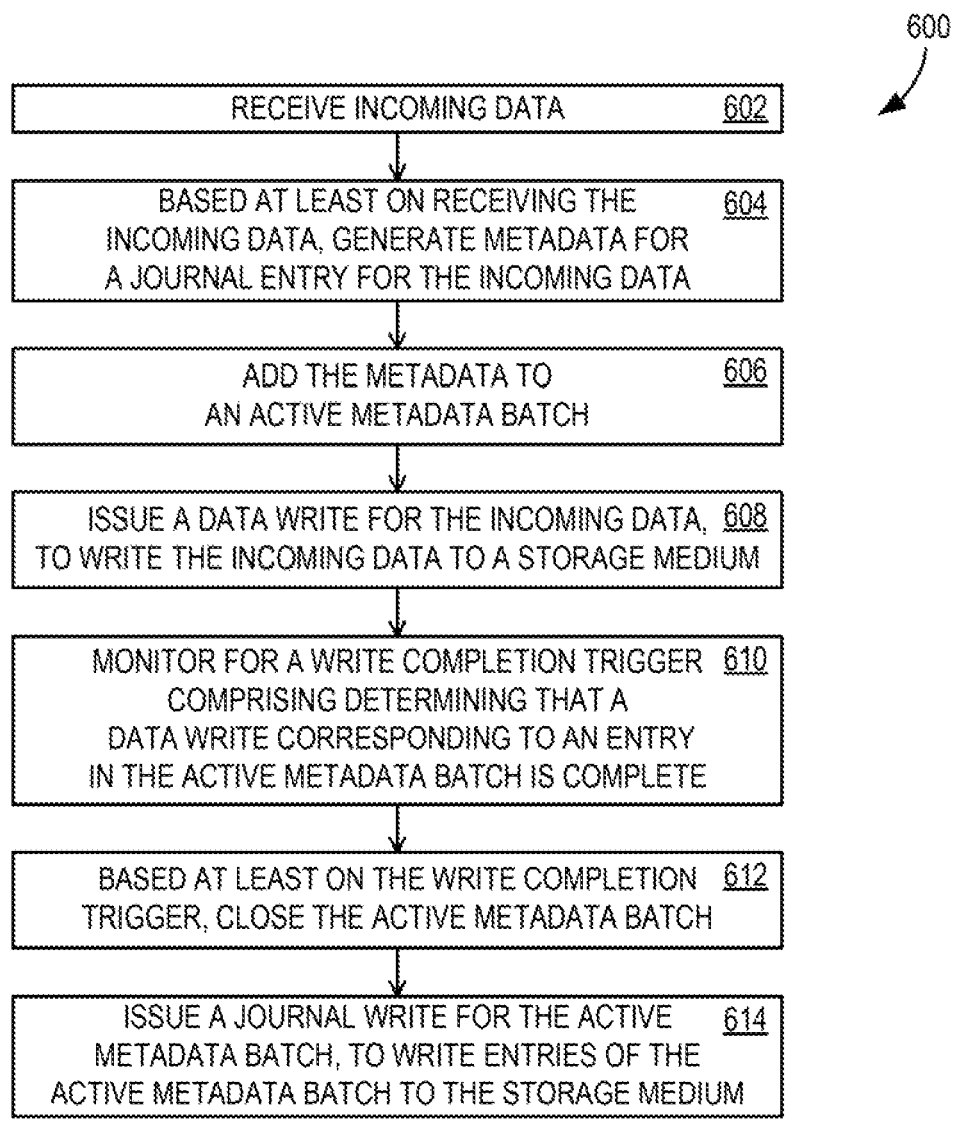
FIG. 6 illustrates another flow chart of exemplary operations associated with the journaling file system of FIG. 1.

FIG. 6 illustrates a flow chart 600 showing a method of adaptive metadata batching. In some examples, the operations of flow chart 600 are performed by one or more computing devices 700 of FIG. 7. Operation 602 includes receiving incoming data. Operation 604 includes, based at least on receiving the incoming data, generating metadata for a journal entry for the incoming data. Operation 606 includes adding the metadata to an active metadata batch. Operation 608 includes issuing a data write for the incoming data, to write the incoming data to a storage medium. Operation 610 includes monitoring for a first trigger, the first trigger comprising determining that a data write corresponding to an entry in the active metadata batch is complete. Operation 612 includes, based at least on the first trigger, closing the active metadata batch. Operation 614 includes issuing a journal write for the active metadata batch, to write entries of the active metadata batch to the storage medium.

Figure 7:
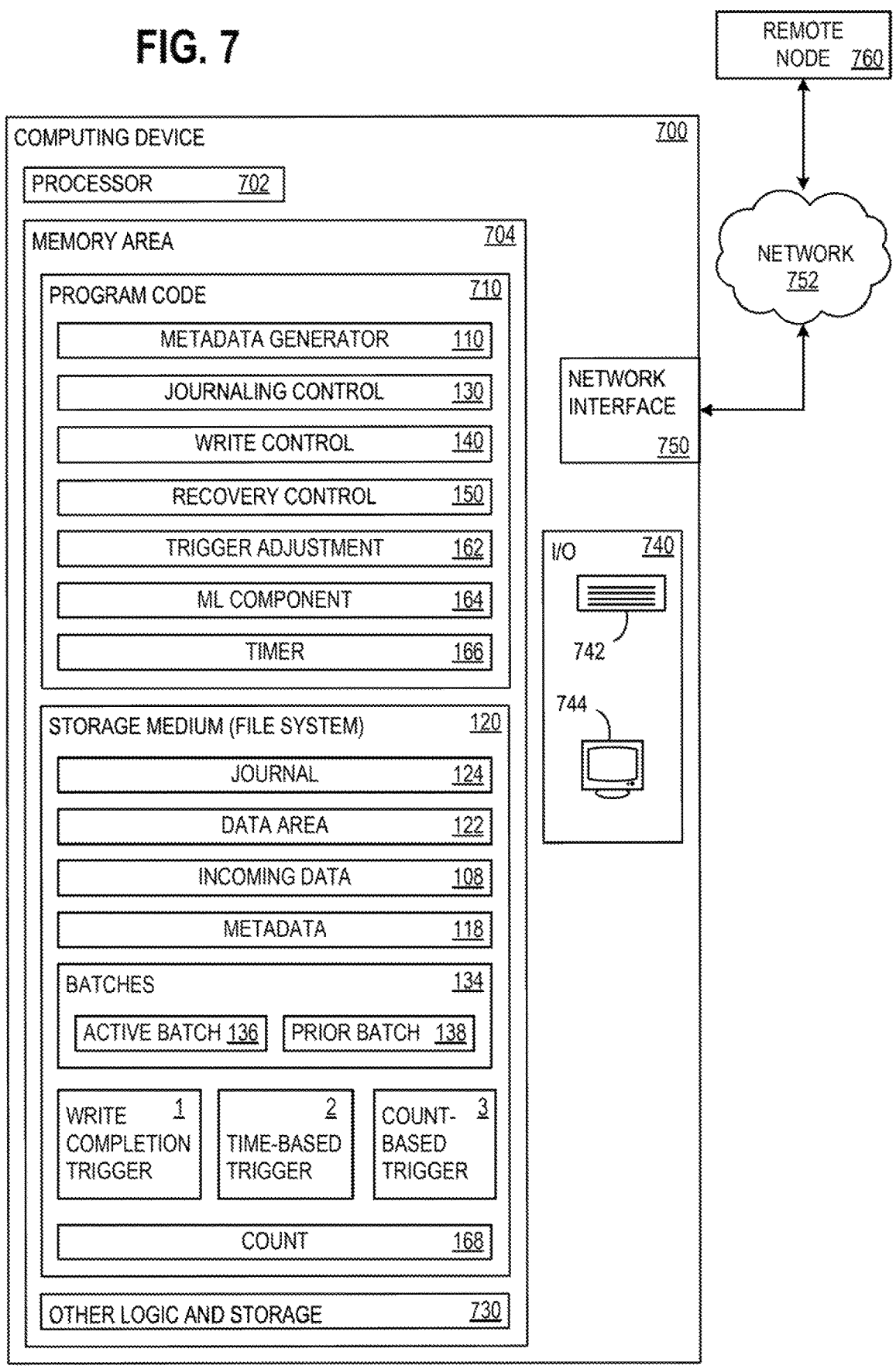
FIG. 7 illustrates a block diagram of a computing device that may host the journaling file system of FIG. 1, according to an example embodiment.

FIG. 7 illustrates a block diagram of computing device 700 that may host journaling file system 100 of FIG. 1. Computing device 700 has at least a processor 702 and a memory area 704 (or memory 704) that holds program code 710, storage medium 120, and other logic and storage 730. Memory area 704 is any device allowing information, such as computer executable instructions and/or other data, to be stored and retrieved. For example, memory area 704 may include one or more random access memory (RAM) modules, flash memory modules, hard disks, solid-state disks, and/or optical disks. Program code 710 comprises computer executable instructions and computer executable components including metadata generator 110, journaling control 130, write control 140, recovery control 150, trigger adjustment component 162 that includes ML component 164 in some examples, and time component 166. In some examples, program code 710 is stored within storage medium 120.

Storage medium 120 is a file system that holds journal 126, data area 122, incoming data 108, metadata 118, batches 134 that includes active metadata batch 136 and at least one prior metadata batch 138, the write completion trigger 1, the time-based trigger 2, the count-based trigger 3, and batch counter 168. Memory area 704 also includes other logic and storage 730 that performs or facilitates other functions disclosed herein or otherwise required of computing device 700. A keyboard 742 and a computer monitor 744 are illustrated as exemplary portions of I/O component 740, which may also or instead include a touchscreen, mouse, trackpad, and/or other I/O devices. A network interface 750 permits communication over a network 752 with a remote node 760, which may represent another implementation of computing device 700, a cloud service, or data source 102 of FIG. 1.

Computing device 700 generally represents any device executing instructions (e.g., as application programs, operating system functionality, or both) to implement the operations and functionality described herein. Computing device 700 may include any portable or non-portable device including a mobile telephone, laptop, tablet, computing pad, netbook, gaming device, portable medium player, desktop personal computer, kiosk, embedded device, and/or tabletop device. Additionally, computing device 700 may represent a group of processing units or other computing devices, such as in a cloud computing system or service. Processor 702 may include any quantity of processing units and may be programmed to execute any components of program code 710 comprising computer executable instructions for implementing aspects of the disclosure. In some embodiments, processor 702 is programmed to execute instructions such as those illustrated in the figures.

ADDITIONAL EXAMPLES

An example system for adaptive metadata batching comprises: a processor; and a computer-readable medium storing instructions that are operative upon execution by the processor to: receive incoming data; based at least on receiving the incoming data, generate metadata for a journal entry for the incoming data; add the metadata to an active metadata batch; issue a data write for the incoming data, to write the incoming data to a storage medium; monitor for a first trigger, the first trigger comprising determining that a data write corresponding to an entry in the active metadata batch is complete; based at least on the first trigger, close the active metadata batch; and issue a journal write for the active metadata batch, to write entries of the active metadata batch to the storage medium.

An exemplary method of adaptive metadata batching comprises: receiving incoming data; based at least on receiving the incoming data, generating metadata for a journal entry for the incoming data; adding the metadata to an active metadata batch; issuing a data write for the incoming data, to write the incoming data to a storage medium; monitoring for a first trigger, the first trigger comprising determining that a data write corresponding to an entry in the active metadata batch is complete; based at least on the first trigger, closing the active metadata batch; and issuing a journal write for the active metadata batch, to write entries of the active metadata batch to the storage medium.

One or more exemplary non-transitory computer storage medium have computer-executable instructions that, upon execution by a processor, cause the processor to at least perform operations that comprise: receiving incoming data; based at least on receiving the incoming data, generating metadata for a journal entry for the incoming data; adding the metadata to an active metadata batch; issuing a data write for the incoming data, to write the incoming data to a storage medium; monitoring for a first trigger, the first trigger comprising determining that a data write corresponding to an entry in the active metadata batch is complete; based at least on the first trigger, closing the active metadata batch; and issuing a journal write for the active metadata batch, to write entries of the active metadata batch to the storage medium.

Alternatively, or in addition to the other examples described herein, examples include any combination of the following:
- based at least on determining that no batch is open, opening the active metadata batch;
- determining a batch opening time;
- monitoring for a second trigger, the second trigger comprising determining that a batch open time exceeds a selected percentage of a moving average of data write durations;
- based at least on the second trigger, closing the active metadata batch;
- issuing a journal write for the active metadata batch, to write entries of the active metadata batch to the storage medium;
- monitoring I/O latencies;
- adjusting the selected percentage of the moving average of data write durations to reduce I/O latencies;
- based at least on adding the metadata to the active metadata batch, incrementing a batch counter;
- monitoring for a third trigger, the third trigger comprising determining that the batch counter exceeds count threshold;
- based at least on the third trigger, closing the active metadata batch;
- issuing a journal write for the active metadata batch, to write entries of the active metadata batch to the storage medium;
- adjusting the count threshold to reduce I/O latencies;
- monitoring for completion of the data write and the journal write;
- based at least on completion of the data write and the journal write, generating an acknowledgement of I/O completion for the incoming data;
- based at least on a recovery trigger, using the metadata in a recovery operation for the incoming data;
- based at least upon determining that the writing operations for both the incoming data and the journal entry for the incoming data are complete; determining an I/O latency for the incoming data;
- determining the I/O latency for the incoming data comprises using a time value of the latency time;
- based at least upon determining the latency for the incoming data, determining an average latency;
- the average latency comprises a moving average;
- the storage medium comprises a magnetic disk;
- based at least on issuing a data write for the incoming data, determining a data write start time;
- based at least on the first trigger, determining a duration for the data write of the incoming data;
- computing the moving average of data write durations;
- based at least on completion of the journal write, determining other data write operations awaiting completion of the journal write;
- based at least on completion of the journal write and other data write operations that had been awaiting completion of the journal write, generating an acknowledgement of I/O completion for data corresponding to the other data write operations;
- adjusting the selected percentage of the moving average of data write durations comprises adjusting the selected percentage with an ML component; and
- adjusting the count threshold comprises adjusting the count threshold with an ML component.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of adaptive metadata batching associated with a journaling file system, the method comprising:
   receiving incoming data;
   based at least on receiving the incoming data, computing metadata for the incoming data and generating a journal entry for updating metadata in an active metadata batch, the computed metadata representing changes to be made to the journaling file system based on the incoming data;
   based on the computed metadata, updating the metadata in the active metadata batch that is waiting to be written to a storage medium;
   issuing a data write for the incoming data, to write the incoming data to the storage medium;
   monitoring for a first trigger, the first trigger comprising determining that a data write corresponding to an entry in the active metadata batch is complete; and
   based at least on the first trigger, issuing a journal write for the active metadata batch to write entries of the active metadata batch to the storage medium.

2. The method of claim 1, further comprising:
   based at least on determining that no batch is open, opening the active metadata batch;
   determining a batch opening time;
   monitoring for a second trigger, the second trigger comprising determining that a batch open time exceeds a selected percentage of a moving average of data write durations;
   based at least on the second trigger, closing the active metadata batch; and
   issuing a journal write for the active metadata batch, to write entries of the active metadata batch to the storage medium.

3. The method of claim 2, further comprising:
   monitoring input/output (I/O) latencies; and
   adjusting the selected percentage of the moving average of data write durations to reduce the I/O latencies, using a machine learning (ML) component.

4. The method of claim 1, further comprising:
   based at least on updating the metadata in the active metadata batch, incrementing a batch counter;
   monitoring for a third trigger, the third trigger comprising determining that the batch counter exceeds a count threshold;
   based at least on the third trigger, closing the active metadata batch; and
   issuing a journal write for the active metadata batch, to write entries of the active metadata batch to the storage medium.

5. The method of claim 1, wherein the active metadata batch comprises a metadata batch of all metadata that has been computed since a prior metadata batch was written to the storage medium.

6. The method of claim 1, further comprising:
   monitoring for completion of the data write and the journal write; and
   based at least on completion of the data write and the journal write, generating an acknowledgement of input/output (I/O) completion for the incoming data.

7. The method of claim 1, further comprising:
   based at least on a recovery trigger, using the metadata in a recovery operation for the incoming data.

8. A computer system for adaptive metadata batching associated with a journaling file system, the computer system comprising:
   a processor; and
   a non-transitory computer readable medium having stored thereon program code for transferring data to another computer system, the program code causing the processor to:
      receive incoming data;
      based at least on receiving the incoming data, compute metadata for the incoming data and generate a journal entry for updating metadata in an active metadata batch, the computed metadata representing changes to be made to the journaling file system based on the incoming data;

based on the computed metadata, update the metadata in the active metadata batch that is waiting to be written to a storage medium;
issue a data write for the incoming data, to write the incoming data to a storage medium;
monitor for a first trigger, the first trigger comprising determining that a data write corresponding to an entry in the active metadata batch is complete; and
based at least on the first trigger, issue a journal write for the active metadata batch, to write entries of the active metadata batch to the storage medium.

9. The computer system of claim 8, wherein the program code is further operative to:
based at least on determining that no batch is open, open the active metadata batch;
determine a batch opening time;
monitor for a second trigger, the second trigger comprising determining that a batch open time exceeds a selected percentage of a moving average of data write durations;
based at least on the second trigger, close the active metadata batch; and
issue a journal write for the active metadata batch, to write entries of the active metadata batch to the storage medium.

10. The computer system of claim 9, wherein the program code is further operative to:
monitor input/output (I/O) latencies; and
adjust the selected percentage of the moving average of data write durations to reduce the I/O latencies, using a machine learning (ML) component.

11. The computer system of claim 8, wherein the program code is further operative to:
based at least on updating the metadata in the active metadata batch, increment a batch counter;
monitor for a third trigger, the third trigger comprising determining that the batch counter exceeds a count threshold;
based at least on the third trigger, close the active metadata batch; and
issue a journal write for the active metadata batch, to write entries of the active metadata batch to the storage medium.

12. The computer system of claim 8, wherein the active metadata batch comprises a metadata batch of all metadata that has been computed since a prior metadata batch was written to the storage medium.

13. The computer system of claim 8, wherein the program code is further operative to:
monitor for completion of the data write and the journal write; and
based at least on completion of the data write and the journal write, generate an acknowledgement of input/output (I/O) completion for the incoming data.

14. The computer system of claim 8, wherein the program code is further operative to:
based at least on a recovery trigger, use the metadata in a recovery operation for the incoming data.

15. A non-transitory computer storage medium having stored thereon program code executable by a first computer system at a first site, the program code embodying a method for adaptive metadata batching associated with a journaling file system, the method comprising:
receiving incoming data;
based at least on receiving the incoming data, computing metadata for the incoming data and generating a journal entry for updating metadata in an active metadata batch, the computed metadata representing changes to be made to the journaling file system based on the incoming data;
based on the computed metadata, updating the metadata in the active metadata batch that is waiting to be written to a storage medium;
issuing a data write for the incoming data, to write the incoming data to a storage medium;
monitoring for a first trigger, the first trigger comprising determining that a data write corresponding to an entry in the active metadata batch is complete;
based at least on the first trigger, issuing a journal write for the active metadata batch to write entries of the active metadata batch to the storage medium.

16. The non-transitory computer storage medium of claim 15, wherein the program code further comprises:
based at least on determining that no batch is open, opening the active metadata batch;
determining a batch opening time;
monitoring for a second trigger, the second trigger comprising determining that a batch open time exceeds a selected percentage of a moving average of data write durations;
based at least on the second trigger, closing the active metadata batch; and
issuing a journal write for the active metadata batch, to write entries of the active metadata batch to the storage medium.

17. The non-transitory computer storage medium of claim 16, wherein the program code further comprises:
monitoring input/output (I/O) latencies; and
adjusting the selected percentage of the moving average of data write durations to reduce the I/O latencies, using a machine learning (ML) component.

18. The non-transitory computer storage medium of claim 15, wherein the program code further comprises:
based at least on updating the metadata in the active metadata batch, incrementing a batch counter;
monitoring for a third trigger, the third trigger comprising determining that the batch counter exceeds a count threshold;
based at least on the third trigger, closing the active metadata batch; and
issuing a journal write for the active metadata batch, to write entries of the active metadata batch to the storage medium.

19. The non-transitory computer storage medium of claim 15, wherein the active metadata batch comprises a metadata batch of all metadata that has been computed since a prior metadata batch was written to the storage medium.

20. The non-transitory computer storage medium of claim 15, wherein the program code further comprises:
monitoring for completion of the data write and the journal write; and
based at least on completion of the data write and the journal write, generating an acknowledgement of input/output (I/O) completion for the incoming data.

* * * * *